(12) United States Patent
Jordanger et al.

(10) Patent No.: US 7,755,400 B2
(45) Date of Patent: Jul. 13, 2010

(54) SYSTEMS AND METHODS OF DIGITAL ISOLATION WITH AC/DC CHANNEL MERGING

(75) Inventors: Ricky Dale Jordanger, Allen, TX (US); David Leonard Larkin, Richardson, TX (US); David Wayne Stout, Lewisville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 91 days.

(21) Appl. No.: 12/129,075

(22) Filed: May 29, 2008

(65) Prior Publication Data

US 2009/0295451 A1    Dec. 3, 2009

(51) Int. Cl.
    *H03L 7/00*    (2006.01)
(52) U.S. Cl. .................. 327/142; 327/306; 327/531
(58) Field of Classification Search ................ 327/306, 327/530–532, 141–143
    See application file for complete search history.

(56) References Cited

U.S. PATENT DOCUMENTS

| | | | | |
|---|---|---|---|---|
| 5,991,453 | A | * | 11/1999 | Kweon et al. ............... 382/250 |
| 6,083,548 | A | * | 7/2000 | Berntsen ..................... 426/530 |
| 6,084,538 | A | * | 7/2000 | Kostelnik et al. ........... 341/120 |
| 7,203,224 | B2 | * | 4/2007 | Scott et al. .................. 375/220 |

\* cited by examiner

*Primary Examiner*—Dinh T. Le
(74) *Attorney, Agent, or Firm*—William B. Kempler; Wade J. Brady, III; Frederick J. Telecky, Jr.

(57) ABSTRACT

Systems and methods for digital isolation in circuits are provided. On power-up in an isolation application, there may be multiple power supplies. For example, one for an input side and one for an output side, both in relation to an isolation barrier. Upon power up, the input and output may not be at the same state. The bias of the output may be the opposite of what is on the input. An isolator solution is provided which integrates the digital isolation into the analog solution. A DC signal corresponds to the static state of the data at start-up and an AC signal is generated when switching begins. In one example, the output level corresponds to the input level when the steady state information is encoded and sent across as an AC signal.

20 Claims, 6 Drawing Sheets

FIG. 7

| LOGIC TABLE ||||
| 710 | 720 | 730 | 740 |
| IN STATE | TX$_{OUTA}$ STATE | TX$_{OUTA}$ DATA AT BUFFER OUTPUT | (UPDATE PULSE OR AC DATA) OUT |
| 0 | 1 | 1 → 0 | 0 (AFTER PULSE OR EDGE) |
| 1 | 0 | 0 → 1 | 1 |
| 0 | 0 | 0 → 1 → 0* | 0 (0-1-0 FILTERED OUT) |
| 1 | 1 | 1 → 0 → 1* | 1 (1-0-1 FILTERED OUT) |

* UPDATE PULSE IS THIN ENOUGH FOR DIGITAL FILTER TO SCREEN OUT

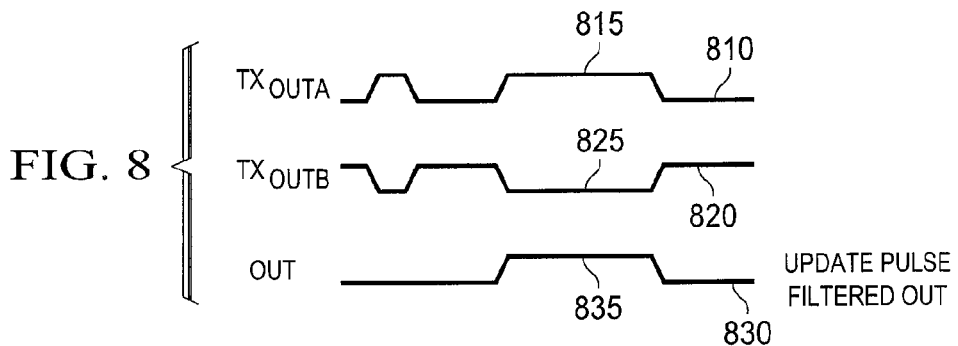

FIG. 8

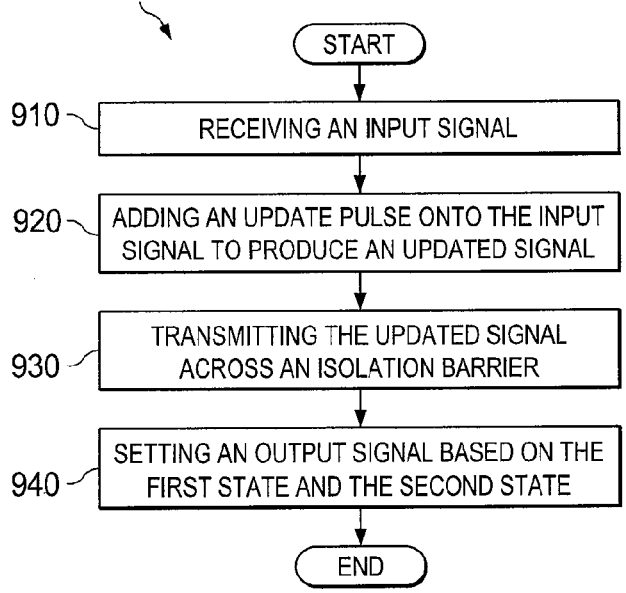

FIG. 9

- 910: RECEIVING AN INPUT SIGNAL
- 920: ADDING AN UPDATE PULSE ONTO THE INPUT SIGNAL TO PRODUCE AN UPDATED SIGNAL
- 930: TRANSMITTING THE UPDATED SIGNAL ACROSS AN ISOLATION BARRIER
- 940: SETTING AN OUTPUT SIGNAL BASED ON THE FIRST STATE AND THE SECOND STATE

US 7,755,400 B2

SYSTEMS AND METHODS OF DIGITAL ISOLATION WITH AC/DC CHANNEL MERGING

TECHNICAL FIELD

The present disclosure is generally related to electronic circuits and, more particularly, is related to systems and methods of digital isolation.

BACKGROUND

Isolation may be used in electrical circuits to provide electrical isolation and an electrical safety barrier. They may be used, for example, to protect data-acquisition components from potentially destructive voltages present at remote transducers. Isolation may be used for galvanic isolation, to isolate high voltages from one another, to break ground loops, and to isolate noise, as non-limiting examples. Isolation may be useful in amplification applications involving low-level signals and in multi-channel applications. Isolation can also aid in the reduction of measurement errors caused by ground loops. Isolation stages may often be used as analogue interfaces between systems with separated grounds. Possible applications in which isolation may be useful include, but are not limited to a floating pulse amplifier, output voltage and current interface, instrumentation in high-noise environments, analog front-end processing, and medical instrumentation.

SUMMARY

Example embodiments of the present disclosure provide an apparatus and methods for digital isolation with AC/DC channel merging. Briefly described, in architecture, one example embodiment of the apparatus, among others, can be implemented as follows: an input buffer for buffering an input signal; gating logic for gating an output of the input buffer; a delay element for introducing delay into the gating logic; a trigger for triggering the gating logic; a buffer/inverter for buffering/inverting an output of the gating logic; an isolation stage for isolating an output of the buffer/inverter; a comparator stage for comparing an output of the isolation stage; an R-S latch for latching an output of the comparator stage; and a filter for filtering an output of the R-S latch to provide an output signal associated with the state of the input signal.

Embodiments of the present disclosure can also be viewed as providing methods for digital isolation with AC/DC channel merging. In this regard, one embodiment of such a method, among others, can be broadly summarized by the following: receiving an input signal with a first state; adding an update pulse with a second state onto the input signal to produce an updated signal; transmitting the updated signal across an isolation barrier; and setting a third state of an output signal state based on the first state and the second state.

BRIEF DESCRIPTION OF THE DRAWINGS

FIG. 7 is a state table for the input and output states and intermediate transitions of the example embodiment isolation circuit of FIG. 2.

FIG. 8 is a signal diagram of the example embodiment isolation circuit of FIG. 2.

FIG. 9 is a flow chart of an example embodiment of a method of digital isolation with merged AC and DC channels using the circuit of FIG. 2.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
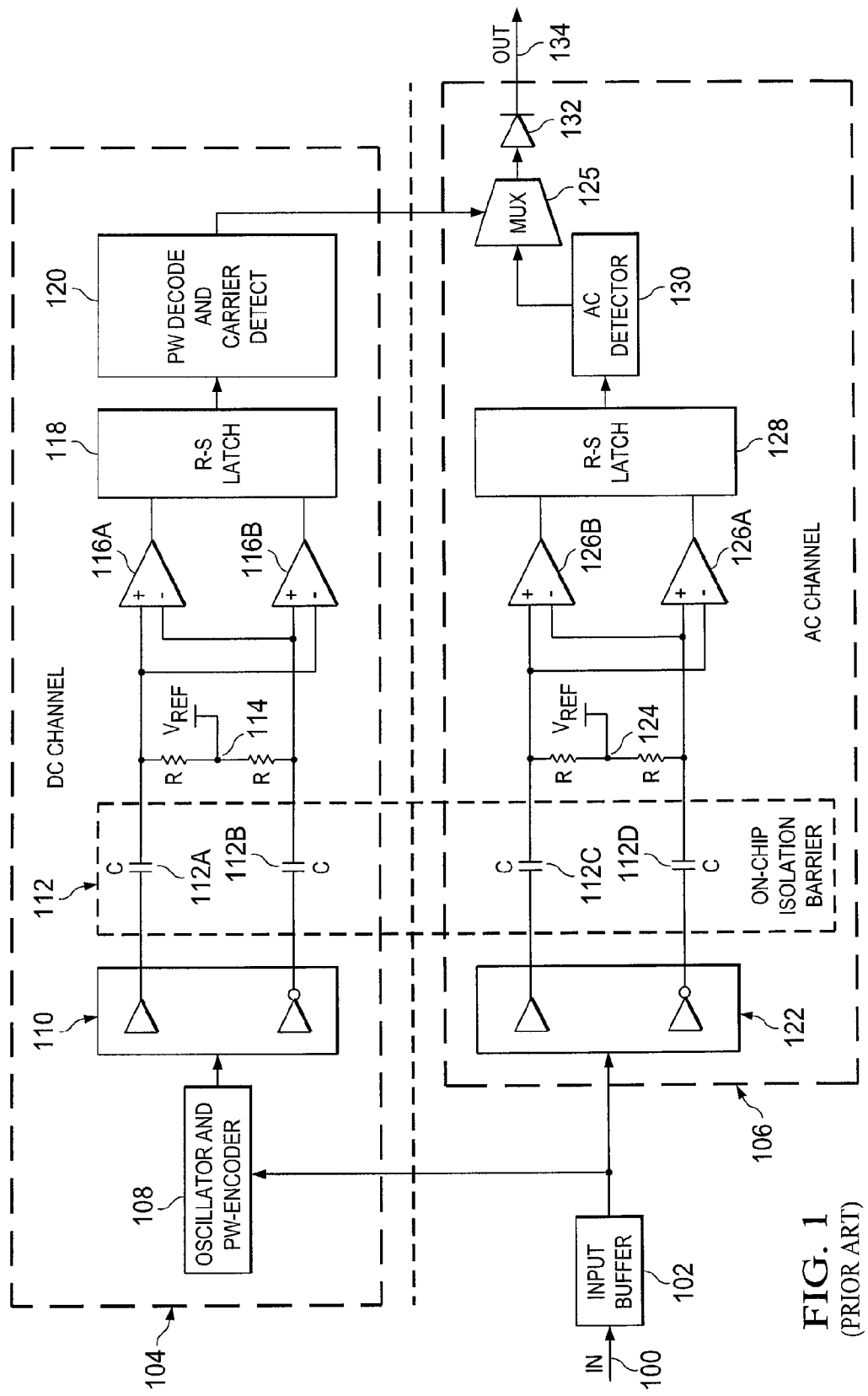
FIG. 1 is a circuit diagram of an example embodiment of an isolation circuit with split AC and DC channels.

On power-up in an isolation application, there may be multiple power supplies: for example, one for an input side and one for an output side, both in relation to an isolation barrier. Upon power up, the input and output may not be at the same state. The bias of the output may be the opposite of the bias on the input. In the prior art embodiment provided in the circuit of FIG. 1, DC channel 104 is split from AC channel 106 and the signals are sent separately. DC channel 104 comprises, but is not limited to oscillator and pulse width (PW) encoder 108, buffer/inverter 110, isolator 112, reference voltage 114, window comparators 116A and 116B, RS latch 118, and PW decode and carrier detect 120.

Input 100 is provided to input buffer 102. The output of buffer 102 is provided to oscillator and pulse width encoder 108 in DC channel 104 and provided to inverter buffer 122 of AC channel 106. Oscillator and pulse width encoder 108 sets a pulse width associated with the DC level provided by the output of input buffer 102. The output of oscillator and pulse width encoder 108 is provided to buffer/inverter 110. The output of the buffer side of buffer/inverter 110 is provided to capacitor 112A of isolator 112 and the output of the inverter side of buffer/inverter 110 is provided to capacitor 112B of isolator 112. Although an example embodiment is shown using capacitors in the isolator 112, inductors or other isolation elements may be used. Reference voltage 114 sets a dc bias level on the DC channel side of the output of isolator 112. The dc biased outputs of isolator 112 are applied to the comparators 116A and 116B in a window comparator configuration. The output of window comparators 116A and 116B are applied to RS latch 118. The output of RS latch 118 is provided to PW decode and carrier detect stage 120.

In an example embodiment, the PW decode section of PW decode and carrier detect stage 120 decodes the pulse width set by the PW encoder 108 into a DC level. The carrier detect section of PW decode and carrier detect stage 120 may include a timer which is reset on each transition received from RS latch 118. If the timer is not reset for a pre-determined duration (specified as the failsafe time), the output 134 will be set to either a high state or a low state depending upon the desired failsafe state. Absence of transitions from RS latch 118 may indicate that the oscillator in 108 is not running due to either a loss of power on the input side of isolation 112 or a circuit malfunction. The output of PW decode and carrier detect stage 120 is provided to multiplexer 125.

Regarding AC channel 106, AC channel 106 comprises, but is not limited to buffer/inverter 122, isolator 112, reference voltage 124, window comparators 126A and 126B, RS latch 128, and AC detector 130. The output of buffer 102 is provided to buffer/inverter 122. The output of the buffer side of buffer/inverter 122 is provided to capacitor 112C of isolator 112 and the output of the inverter side of buffer/inverter 122 is provided to capacitor 112D of isolator 112. Although an example embodiment is shown using capacitors in isolator 112, inductors or other isolation elements may be used. Reference voltage 124 sets a DC bias level on the AC channel side of the output of isolator 112. The DC biased outputs of isolator 112 are applied to comparators 126A and 126B in a window comparator configuration. The output of window comparators 126A and 126B are applied to RS latch 128. The output of RS latch 128 is provided to AC detector 130. The output of AC detector 130 is provided to multiplexer 125. The output of the AC channel and the DC channel are multiplexed in multiplexer 125.

Similar to the operation of the carrier detect circuit, in an example embodiment, AC detector 130 determines if information is being received on the AC channel. If information is not being received on the AC channel, then the DC channel should be used for the most accurate representation of the input state. The multiplexer may be used to select between PW decode output, AC channel output, or a failsafe state, for example. The selected input is transferred to output 134. The output of multiplexer 125 is provided to buffer 132, such that output 134 is set to the start up voltage value of input 100.

Figure 2:
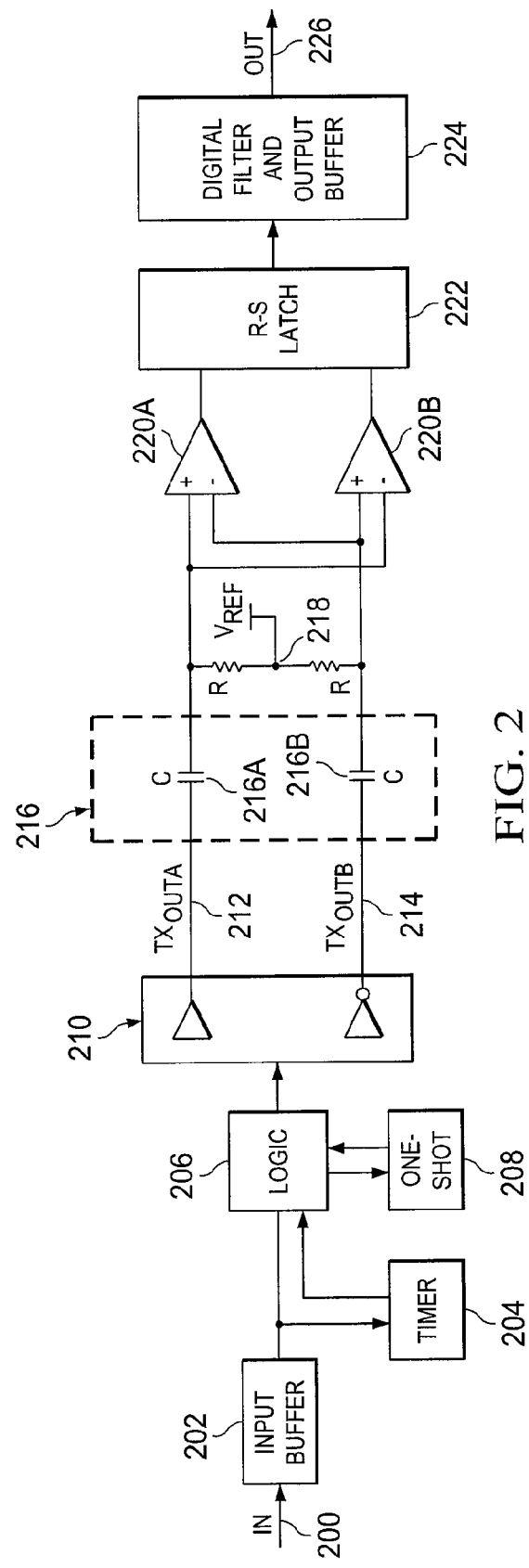
FIG. 2 is a circuit diagram of an example embodiment of an isolation circuit with merged AC and DC channels.

FIG. 2 presents an example embodiment of an isolator solution which integrates the digital isolation into the analog solution. The integrated solution of FIG. 2 comprises, but is not limited to input buffer 202, timer 204, logic 206, one-shot timer 208, buffer/inverter 210, isolator 216, reference voltage 214, window comparators 220A and 220B, RS latch 222, and digital filter and output buffer 224. An input voltage, which may represent a dc startup voltage, is provided to input buffer 202. The output of buffer 202 is provided to timer 204 and logic 206.

Timer 204 may be used to provide a delay element. Without the delay introduced by timer 204, an update pulse may occur, resulting in a forced decision between processing the update pulse or the input edge. Also, without the delay introduced by timer 204, the update input pulse may result in a pulse skew on the output. The delay causes the pulse to be deterministic, so that random jitter is avoided. The input pulse is delayed from crossing the isolation barrier until a specified time. In an example embodiment, the specified time may be twice the pulse width of the update pulse. A minimum pulse width of the update pulse may be determined by a minimum pulse width that comparators 220A and 220B are able to detect to prohibit the jitter on the output. Otherwise, if an update pulse is followed by an actual input change (a lag time), then it could change too quickly for comparators 220A and 220B to properly process. The minimum lag time may depend on the comparator architecture and process technology used to implement the comparators, as well as on the operating ranges of temperature and supply voltage of the comparators. The length of the delay may depend on the comparator architecture and process technology used to implement the comparators, as well as on the operating ranges of temperature and supply voltage of the comparators.

If two consecutive edges are separated in time by a value less than what the comparators are able to process, then one of the edges may not be detected by the comparator. Note, that the edge which will go undetected is indeterminate. FIGS. 3-6 illustrate example embodiments of problems that may occur in the case of coincident update pulse and input change when the input is delayed, as well as the case of an update pulse followed too closely by an actual input change and vice versa when the input is not delayed.

Figure 3:
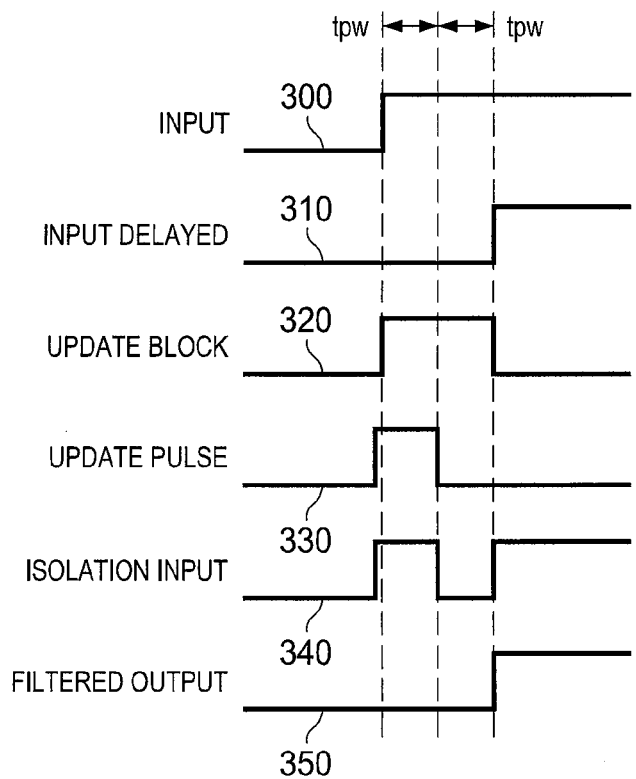
FIG. 3 is a signal diagram of an example embodiment of the isolation circuit of FIG. 2 with the input delayed.
Figure 4:
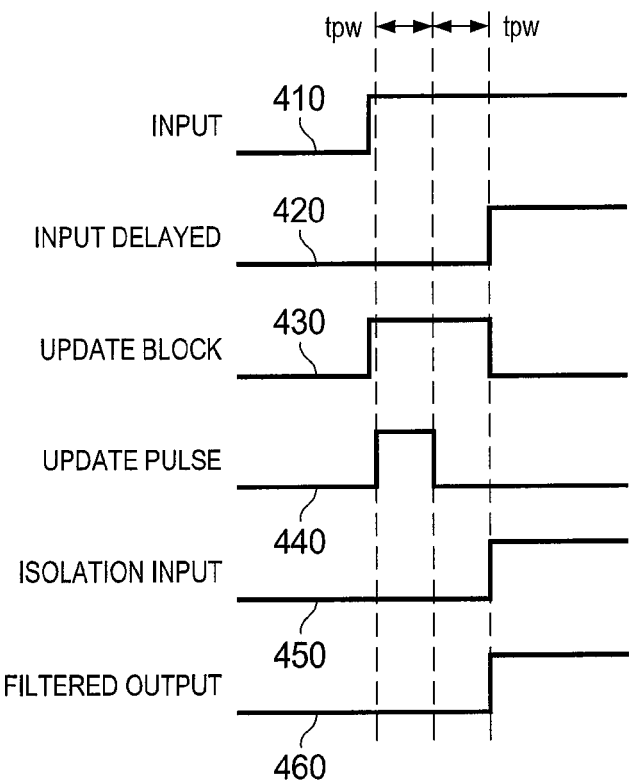
FIG. 4 is a signal diagram of an example embodiment of the isolation circuit of FIG. 2 with the input delayed.

FIGS. 3-6 refer to possible comparator output scenarios when a pulse width of duration less than its minimum is presented at the comparator inputs. FIGS. 3 and 4 provide signal diagrams of example embodiments of the isolation circuit of FIG. 2 with the input delayed. In FIG. 3, the update pulse arrives before the input pulse. Signal 300 comprises a representation of an input signal. Signal 310 comprises a representation of the input signal with a delay. Signal 320 comprises a representation of an update block, which is the time period between the input and the delayed input. Update block 320 corresponds to the time period during which an update pulse may be blocked if the update pulse arrives after the input pulse. Signal 330 comprises a representation of the update pulse which is used to update the state of the output. Signal 340 comprises a representation of an input to the isolation stage. In this example embodiment, isolation stage input 340 is produced from an XOR operation on delayed input signal 310 and update pulse 330. Signal 350 comprises a representation of a filtered output signal corresponding to delayed input signal 310. A delay in the input is deterministic, causing a propagation delay, but no output jitter.

In FIG. 4, the update pulse arrives after the input pulse. Signal 410 comprises a representation of an input signal. Signal 420 comprises a representation of the input signal with a delay. Signal 430 comprises a representation of an update block, which is the time period between the input and the delayed input. Update block 430 corresponds to the time period during which an update pulse may be blocked if the update pulse arrives after the input pulse. Signal 440 comprises a representation of the update pulse which is used to update the state of the output. Signal 450 comprises a representation of an input to the isolation stage. In this example embodiment, isolation stage input 450 is produced from delayed input signal 420 since update pulse 440 is blocked by update block signal 430. The function is still an XOR, in this example embodiment, but since the update pulse occurs after update block 430 has changed to a high state, update pulse 440 is ignored and treated as a low state. Signal 460 comprises a representation of a filtered output signal corresponding to delayed input signal 420. A delay in the input is deterministic, causing a propagation delay, but no output jitter.

Figure 5:
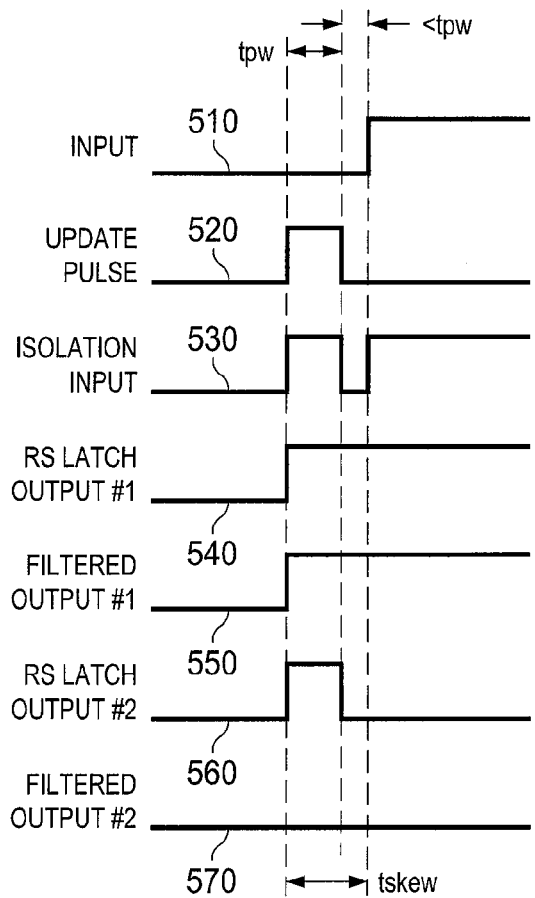
FIG. 5 is a signal diagram of an example embodiment of the isolation circuit of FIG. 2 without the input delayed.
Figure 6:
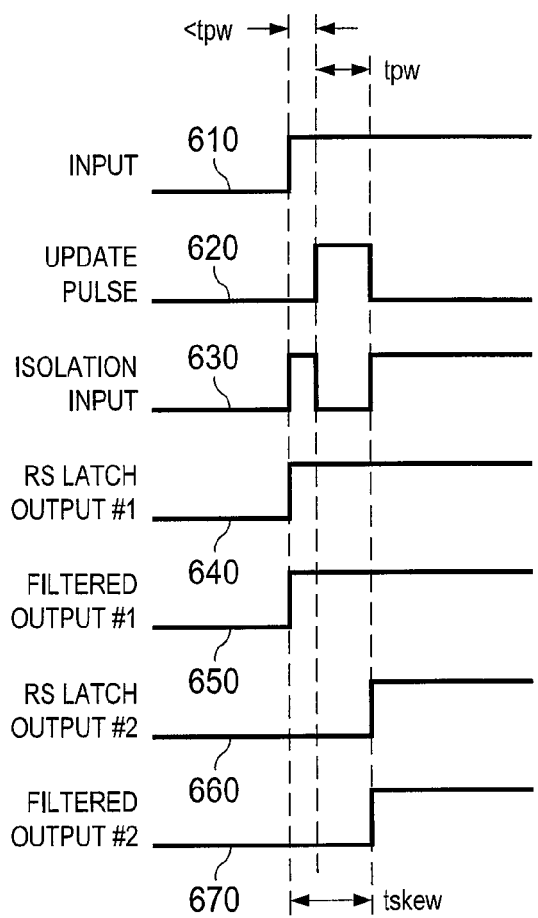
FIG. 6 is a signal diagram of an example embodiment of the isolation circuit of FIG. 2 without the input delayed.

FIGS. 5 and 6 provide signal diagrams of example embodiments of the isolation circuit of FIG. 2 without the input delayed. In FIG. 5, the update pulse arrives before the input pulse. Signal 510 comprises a representation of an input signal. Signal 520 comprises a representation of the update pulse which is used to update the state of the output. Signal 530 comprises a representation of an input to the isolation stage. In this example embodiment, isolation stage input 530 is produced from an XOR operation on input signal 510 and update pulse 520. Signal 540 comprises a representation of a first output of an RS latch. Signal 550 comprises a representation of a filtered output signal corresponding to output signal 540. However, the output of the RS Latch is indeterminate, as provided with signal 560, a representation of a second possible output of an RS latch. Signal 570 comprises a representation of a filtered output signal corresponding to output signal 550. Filtered output 570 may not be correct until an additional update pulse occurs, leading to a large pulse skew. Since the output of the RS Latch is indeterminate, a propagation delay will also be indeterminate, causing random output jitter.

In FIG. 6, the update pulse arrives after the input pulse. Signal 610 comprises a representation of an input signal. Signal 620 comprises a representation of the update pulse which is used to update the state of the output. Signal 630 comprises a representation of an input to the isolation stage. In this example embodiment, isolation stage input 630 is produced from an XOR operation on input signal 610 and update pulse 620}. Signal 640 comprises a representation of a first output of an RS latch. Signal 650 comprises a representation of a filtered output signal corresponding to output signal 640. However, the output of the RS Latch is indeterminate, as provided with signal 660, a representation of a second possible output of an RS latch. Signal 670 comprises a representation of a filtered output signal corresponding to output signal 660. Since the output of the RS Latch is indeterminate, a propagation delay will also be indeterminate, causing random output jitter.

An output of timer 204 is provided to logic 206. Timer 204 gates logic 206 when the input pulse is to be propagated across isolator 216. Logic 206 is gated by the output of timer 204 to provide a pulse from one shot 208 or the AC signal across isolator 216. In an example embodiment, an RC timer is used for one shot 208. Other timer elements may be suitable as well. Logic 206 may comprise a circuit composed of combinational logic gates, including, but not limited to, XOR gates, latches, AND gates, and OR gates.

In some embodiments, there may be a desired pulse width and maximum pulse width variation for operability. The pulse width should be chosen such that it may be reliably filtered on the output side of isolator 216. It may be undesirable for the update pulse to be discernible in the data. The update pulse should be used to set the initial start-up state.

The analog signal with the integrated start up state pulse is then provided to buffer/inverter 210. The output of the buffer side of buffer/inverter 210 is provided to capacitor 216A of isolator 216 and the output of the inverter side of buffer/inverter 210 is provided to capacitor 216B of isolator 216. Although an example embodiment is shown using capacitors in isolator 216, inductors or other isolation elements may be used. Reference voltage 114 sets a DC bias level on the AC channel side of the output of isolator 216. The DC biased outputs of isolator 216 are applied to comparators 220A and 220B in a window comparator configuration. The output of window comparators 220A and 220B are applied to RS latch 222. Although window comparators are provided in example embodiments, other devices or methods may be used to supply/determine the input signal for latch 222, such as, but not limited to voltage or current mode comparators, amplifiers, or any other means of amplifying the signals present at the output of 216. The output of RS latch 222 is provided to digital filter and output buffer 224. Output 226 of digital filter and output buffer 224 is set to the start up voltage value of input 200.

The example embodiment of FIG. 2 integrates the digital isolation into the analog solution. The coupling could be with either a capacitor or an inductive solution, among others. The same signal technique could be used in both the capacitive and inductive solutions because both inductive and capacitive coupling may be used to pass the digital signal. The embodiment of FIG. 2 saves space and materials and, therefore, cost.

At start-up, the control input may be at a steady state DC value. With a capacitive isolation system the DC information is encoded and sent across the isolation barrier. An edge, which can be seen by a capacitor, will not be present, because the capacitor works on dV/dT, and an edge must be present to pass through the capacitor in an AC coupled system. In the example embodiment of FIG. 2, the DC signal corresponds to the static state of the data at start-up and the AC signal is generated when switching begins. In one example, at start-up, the digital side is powered on first and the data level on the input in this example is set at a high level. Then the bus, or field, side is turned on and it defaults to a low level. So the input data level is high, and the input data has yet to switch. In this case, the output level will not correspond to the input level until the steady state information is encoded and sent across as an AC signal.

Reference voltage 218 may be set to roughly half the differential voltage on the output side of the isolator to keep comparators 220A and 220B in a specified common mode voltage range. Dual comparators 220A and 220B may then be configured as a window comparator. Hysteresis between the switching of comparators 220A and 220B occurs from the built-in offset of each one of comparators 220A and 220B. Comparators 220A and 220B may be on a single semiconductor die and, thus, will have substantially similar offset voltages. When comparators 220A and 220B are configured with opposite input polarities, a natural hysteresis occurs between comparators 220A and 220B. RS latch 222 may be an RS flip-flop logic device with a latched output. At the output of RS latch 222, the DC and AC signals are still together. The DC signal is filtered out by the digital filter and buffer 224.

The digital portion of input signal 200 may be used to force the output to an associated state. In a previous technology, if an edge is provided at a capacitor, although the pulse is filtered out, the output state may not correlate with the correct startup state. However, using the example embodiment circuit of FIG. 2, the output state correlates with the input state. Table 700 of FIG. 7 provides a state table for the input and output states and intermediate transitions of the circuit of FIG. 2. Column 710 provides the state of the input. This input state should correlate with the output state. However, since the input and output are separated by an isolation barrier, the output state may not originally correlate. Column 720 provides example output states of 0 and 1 for each state of the input provided in column 710. The four possible states are: 0,0; 0,1; 1,0; 1,1.

Column 730 provides example transitions of the output states. When the input state is 0 and the output state is 1, the output state transitions from 1 to 0. When the input state is 1 and the output state is 0, the output state transitions from 0 to 1. When the input state is 0 and the output state is 0, the output state transitions from 0 to 1 to 0. The 0-1-0 pulse is filtered out by the digital filter and the output state remains at 0, so there's ultimately no change at the output. When the input state is 1 and the output state is 1, the output state transitions from 1 to 0 to 1. The 1-0-1 pulse is filtered out by the digital filter and the output state remains at 1, so there's ultimately no change at the output. Column 740 provides the output state after the transitions of column 730 have occurred.

FIG. 8 provides an example signal diagram of the outputs of buffer 210 and output 226 of FIG. 2. TXOUTA 810 is the noninverted output of buffer 210. TXOUTB 820 is the inverted output of buffer 210. OUT 830 is the output of digital filter and output buffer 224. Update pulse 815 on noninverted output 810 is reflected as update pulse 825 on inverted output 820. This update pulse results in update pulse 835 on the output 830. Update pulse 835 sets the state of the output and is filtered out by the digital filter.

Flow chart 900 of FIG. 9 provides an example embodiment of a method of digital isolation with AC/DC channel merging. In block 910, an input signal with a first state is received. In step 920, an update pulse with a second state is added onto the received input signal to produce an updated signal. In block 930, the updated signal is transmitted across an isolation barrier. The isolation may be passive (capacitive or inductive, as a nonlimiting example) or active (isolation amplifiers, as a nonlimiting example). In block 940, a third state of an output signal is set based on the first state and the second state.

Figure 10:
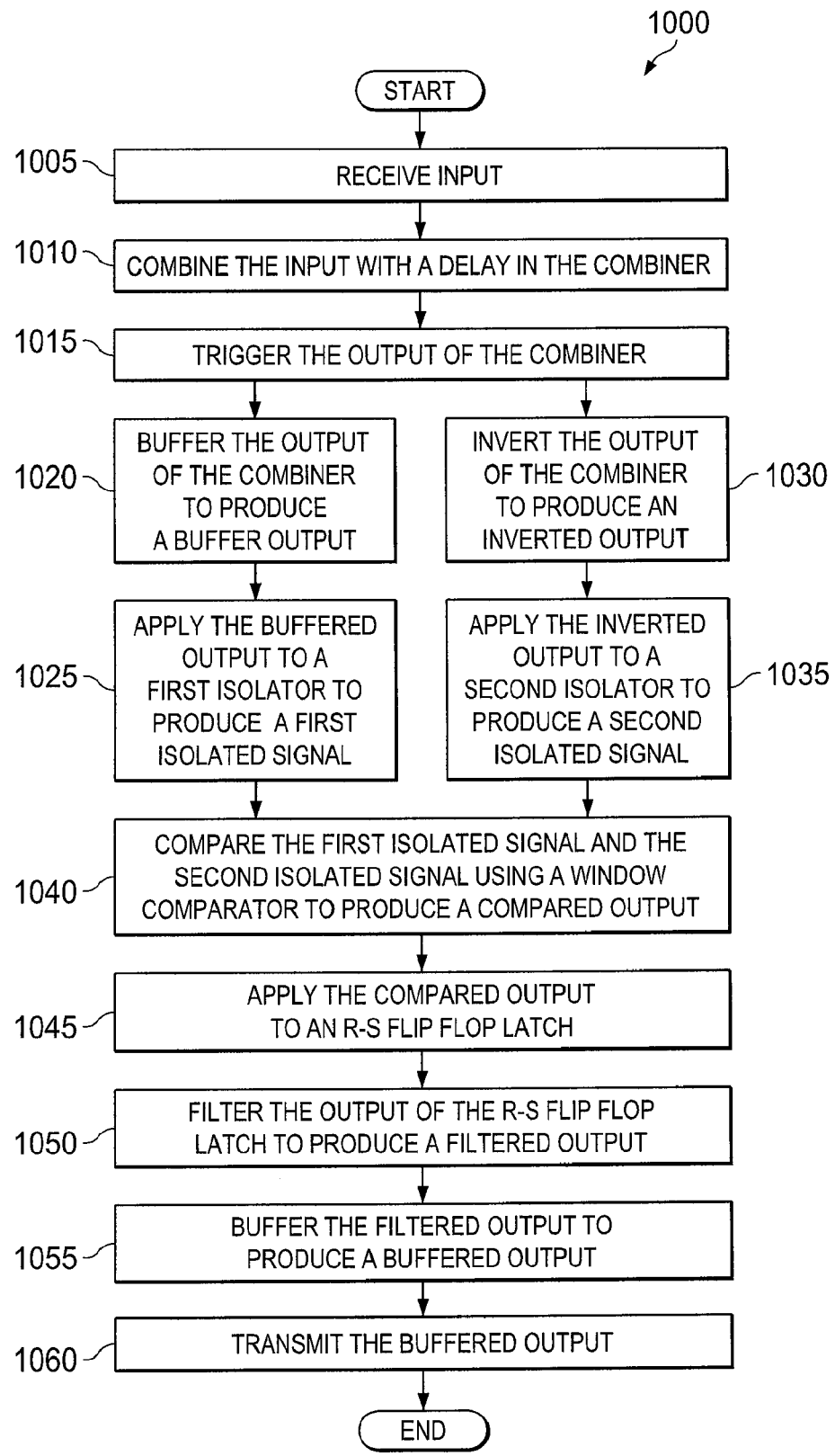
FIG. 10 is a flow chart of an example embodiment of a method of digital isolation with merged AC and DC channels using the circuit of FIG. 2.

Flow chart 1000 of FIG. 10 provides an example embodiment of a method of digital isolation with AC/DC channel merging. In block 1005, an input is received. In block 1010, the input is combined with a delay in a combiner. In block 1015, the output of the combiner is triggered. In block 1020, the output of the combiner is buffered to produce a buffered output. In block 1015, the output of the combiner is triggered. In block 1030, the output of the combiner is inverted to produce an inverted output. In block 1025, the buffered output is applied to a first isolator to produce a first isolated signal. In block 1035, the inverted output is applied to a second isolator to produce a second isolated signal.

In block 1040 the first isolated signal and the second isolated signal are compared using a window comparator to produce a compared output. In block 1045, the compared output is applied to an R-S flip-flop latch. In block 1050, the output of the R-S flip-flop latch is filtered to produce a filtered output. In block 1055, the filtered output is buffered to produce a buffered output. In step 1060, the buffered output is transmitted.

The flow chart of FIGS. 9 and 10 show the architecture, functionality, and operation of a possible implementation of the digital isolation software. In this regard, each block represents a module, segment, or portion of code, which comprises one or more executable instructions for implementing the specified logical function(s). It should also be noted that in some alternative implementations, the functions noted in the blocks may occur out of the order noted in FIGS. 9 and 10. For example, two blocks shown in succession in FIG. 10 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of the example embodiments of the present disclosure in logic embodied in hardware or software-configured mediums.

Therefore, at least the following is claimed:

1. A method comprising:
    receiving an input signal;
    combining the input signal with a delayed input signal in a logic circuit;
    gating the output of the logic circuit;
    buffering the output of the logic circuit to produce a buffered output;
    inverting the output of the logic circuit to produce an inverted output;
    applying the buffered output to a first isolator to produce a first isolated signal;
    applying the inverted output to a second isolator to produce a second isolated signal;
    comparing the first isolated signal and the second isolated signal using a window comparator;
    applying an output of the window comparator to an R-S flip-flop latch;
    filtering an output of the R-S flip-flop latch;
    buffering an output of the filtering; and
    transmitting an output of the buffering.

2. The method of claim 1, wherein at least one of the first and second isolators comprises at least one of a capacitive isolator and an inductive isolator.

3. The method of claim 1, wherein the window comparator comprises a first comparator and a second comparator fabricated on one semiconductor die.

4. The method of claim 3, wherein the comparators have substantially equal offset voltages.

5. An apparatus comprising:
    an input buffer for buffering an input signal;
    gating logic coupled to the input buffer, the gating logic for gating an output signal of the input buffer;
    a delay element coupled to the gating logic, the delay element for introducing delay into the gating logic;
    a trigger coupled to the gating logic, the trigger for triggering the gating logic;
    a buffer/inverter coupled to the gating logic, the buffer inverter for buffering an output of the gating logic to produce a buffered output and for inverting the output of the gating logic to produce an inverted output;

an isolation stage coupled to the buffer/inverter, the isolation stage for isolating an output of the buffer to produce an isolated buffered_output and an output of the inverter to produce an isolated inverted output;

a comparator stage coupled to the isolation stage, the comparator stage for comparing the isolated buffer output of the isolation stage with the isolated inverted output of the isolation stage;

an R-S latch coupled to the comparator stage, the R-S latch_for latching an output of the comparator stage; and a filter coupled to the R-S latch, the filter for filtering an output of the R-S latch to provide an output signal associated with the state of the input signal.

6. The apparatus of claim 5, wherein the isolation stage comprises at least one of a capacitive isolator and an inductive isolator.

7. The apparatus of claim 5, wherein the delay element comprises an RC circuit.

8. The apparatus of claim 5, wherein the trigger comprises a one-shot timer.

9. The apparatus of claim 5, wherein the comparator stage comprises a window comparator.

10. The apparatus of claim 9, wherein the window comparator comprises a first comparator and a second comparator, the first and second comparators fabricated on one semiconductor die.

11. A method comprising:
receiving an input signal;
generating a delayed input signal;
generating an update pulse for updating a state of an output signal;
combining the update pulse with the input signal, and the delayed input signal to produce an updated signal;
sending the updated signal across one of a capacitive or inductive isolation barrier; and
setting a state of an output signal based on the updated signal.

12. The method of claim 11, wherein combining the update signal comprises:
combining the input pulse with the delayed input signal in a logic circuit; and
gating the output of the logic circuit.

13. The method of claim 12, wherein the delay is provided by a timer.

14. The method of claim 12, wherein the gating is performed by a one-shot timer.

15. The method of claim 11, wherein the isolation barrier comprises a passive isolation barrier.

16. The method of claim 15, wherein the passive isolation barrier comprises at least one of a capacitor and an inductor.

17. The method of claim 11, wherein setting the output signal state comprises setting the output of a latch.

18. The method of claim 17, wherein the latch is set based on the output of a comparison stage at an output of the capacitive or inductive isolation barrier.

19. The method of claim 11, wherein setting the output signal state comprises filtering the update pulse from the updated signal.

20. The method of claim 11, further comprising setting the output of the isolation barrier with a DC reference voltage.

* * * * *